(12) United States Patent
Matsumoto (10) Patent No.: US 8,456,059 B2
(45) Date of Patent: Jun. 4, 2013

(54) ELECTRIC GENERATOR

(75) Inventor: Masaharu Matsumoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 343 days.

(21) Appl. No.: 12/985,577

(22) Filed: Jan. 6, 2011

(65) Prior Publication Data

US 2011/0175367 A1    Jul. 21, 2011

(30) Foreign Application Priority Data

Jan. 21, 2010    (JP) .................................. 2010-010787

(51) Int. Cl.
*H02K 35/02*    (2006.01)
(52) U.S. Cl.
USPC ........................................ 310/309; 310/12.15
(58) Field of Classification Search
USPC .................... 310/12.15, 15, 308, 309
See application file for complete search history.

(56) References Cited

U.S. PATENT DOCUMENTS

| | | | |
|---|---|---|---|
| 8,368,260 B2 * | 2/2013 | Ma ................. | 310/15 |
| 8,405,255 B2 * | 3/2013 | Mochida et al. .......... | 310/15 |
| 2004/0007877 A1 * | 1/2004 | Boland et al. ............ | 290/1 R |
| 2009/0051229 A1 * | 2/2009 | Shau ........................ | 310/15 |

FOREIGN PATENT DOCUMENTS

| | | |
|---|---|---|
| JP | 2009-95181 | 4/2009 |
| WO | 2010/035507 | 4/2010 |
| WO | 2010/047076 | 4/2010 |

* cited by examiner

*Primary Examiner* — Tran Nguyen (74) *Attorney, Agent, or Firm* — Panasonic Patent Center (57) ABSTRACT

An electric generator includes an electric-power generating mechanism of an electrostatic induction type or an electromagnetic induction type, a first rectification portion, an electricity accumulation portion, an outer positive electrode, and an outer negative electrode. The electric-power generation mechanism has a first electrode and a second electrode, and the first rectification portion has input terminals electrically connected to the first electrode and the second electrode respectively, and has an output portion including positive and negative terminals. The electricity accumulation portion has an inner positive electrode electrically connected to the positive terminal, and an inner negative electrode electrically connected to the negative terminal. The outer positive electrode is electrically connected to the inner positive electrode, and the outer negative electrode is electrically connected to the inner negative electrode. The electric generator has an outer shape which can be substituted for a battery to be used in the electronic apparatus.

14 Claims, 9 Drawing Sheets

ELECTRIC GENERATOR

BACKGROUND OF THE INVENTION

1. Field of the Invention

The present invention relates to electric generators for use in various types of electronic apparatuses, such as watches, hearing aids, cellular phones, or personal computers.

2. Background Art

In recent years, there has been advancement of diversification and functionality of electronic apparatuses, such as cellular phones and personal computers. Along therewith, there have been increased processing loads exerted on control devices such as CPUs, thereby increasing electric power consumption and thus increasing the frequencies of recharges and battery replacements. Therefore, electronic apparatuses have been required to incorporate electric generators therein.

Figure 11:
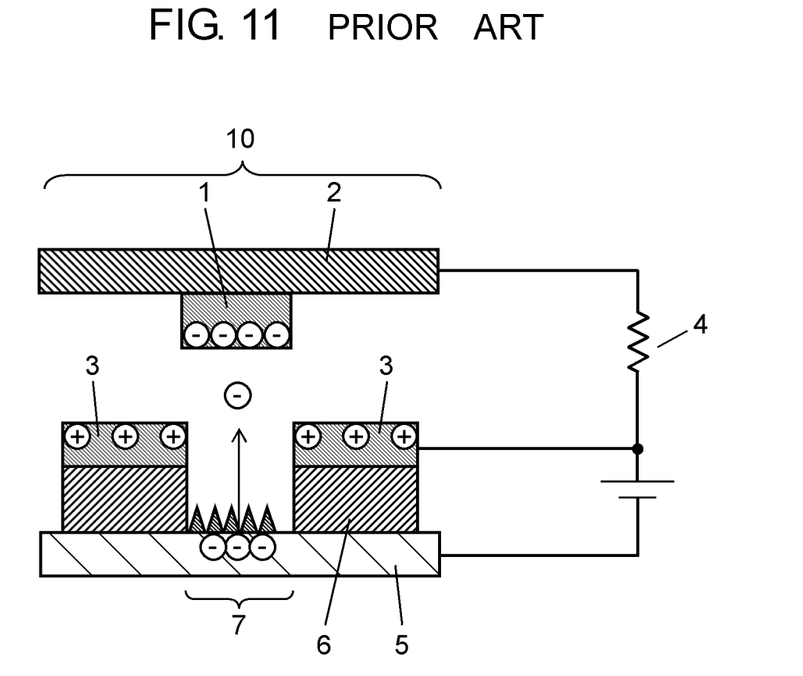
FIG. 11 shows a schematic cross-sectional view of a conventional electric generator.

Such a conventional electric generator will be described with reference to FIG. 11. FIG. 11 is a schematic cross-sectional view of a conventional electric generator. Electric generator 10 includes movable electrode 1, swingable part 2, fixed electrodes 3, resistance element 4, electric-charge supply electrode 5, insulation part 6 and electron discharge portion 7.

Movable electrode 1 is formed of an electret. "Electret" refers to a material capable of continuously forming an electric field and can be fabricated by, for example, applying a DC voltage to a dielectric material such as a resin, under a high temperature, for charging it. Electrons have been preliminarily injected into movable electrode 1, so that an electric charge is held in a surface thereof.

Movable electrode 1 is provided on the lower surface of swingable part 2. Fixed electrodes 3 face movable electrode 1. Fixed electrodes 3 and swingable part 2 are connected to respective end portions of resistance element 4. Insulation part 6 is provided between the lower surfaces of fixed electrodes 3 and electric-charge supply electrode 5. Insulation part 6 is provided with a recess. Electron discharge portion 7 is provided on the bottom surface of the recess.

If vibrations are applied to electric generator 10 from the outside, swingable part 2 sways in the horizontal direction, which causes the projection of movable electrode 1 opposing to fixed electrodes 3 to intersect with fixed electrodes 3. Hereinafter, this state will be simply expressed as "movable electrode 1 intersects with fixed electrodes 3". Electric charges are induced in fixed electrodes 3 intersecting with movable electrode 1, due to electrostatic induction. For example, when a negative electric charge is held in the surface of movable electrode 1 which is faced to fixed electrodes 3, positive electric charges are induced in fixed electrodes 3. As a result, a voltage is applied between the opposite ends of resistance element 4, thereby inducing an electric current in the downward direction.

By causing movable electrode 1 and fixed electrodes 3 to intersect with each other over larger areas thereof, a downward electric current flows through resistance element 4, as described above. On the other hand, if the areas of movable electrode 1 and fixed electrodes 3 which intersect with each other are decreased due to vibrations of swingable part 2, an upward electric current flows through resistance element 4, since the positive electric charges induced in fixed electrodes 3 are decreased. In other words, since movable electrode 1 vibrates while intersecting with fixed electrodes 3, a downward or upward electric current flows through resistance element 4, thereby inducing an AC voltage between the opposite ends of resistance element 4.

Further, electron discharge portion 7 is provided, in order to generate a voltage between the opposite ends of resistance element 4, even when movable electrode 1 has no portion intersecting with fixed electrodes 3. Electron discharge portion 7 discharges electrons from the surface of electric-charge supply electrode 5 for injecting electrons into movable electrode 1 provided oppositely thereto when a voltage is applied between fixed electrodes 3 and electric-charge supply electrode 5. Thus, in the event of a drop of the voltage between the ends of resistance element 4, a voltage is applied between fixed electrodes 3 and electric-charge supply electrode 5, thereby preventing the drop of the voltage induced between the ends of resistance element 4.

Electric generator 10 having the aforementioned structure is formed on a circuit board (not illustrated) in an electronic apparatus (not illustrated) for supplying electric power for driving the electronic apparatus, even when the electronic apparatus incorporates no battery.

However, since electric generator 10 is formed on the circuit board in the electronic apparatus, only the electronic apparatus structured on the presumption that it is incorporated with electric generator 10 is enabled to use electric generator 10 for electric power generation.

SUMMARY OF THE INVENTION

An electric generator according to the present invention includes an electric-power generating mechanism of an electrostatic induction type or an electromagnetic induction type, a first rectification portion, an electricity accumulation portion, an outer positive electrode, and an outer negative electrode. The electric-power generation mechanism has a first electrode and a second electrode, and the first rectification portion has a pair of input terminals electrically connected to the first electrode and the second electrode, respectively, and has an output portion including a positive terminal and a negative terminal. The electricity accumulation portion has an inner positive electrode electrically connected to the positive terminal and an inner negative electrode electrically connected to the negative terminal. The outer positive electrode is electrically connected to the inner positive electrode, and the outer negative electrode is electrically connected to the inner negative electrode. The electric generator has an outer shape which can be substituted for a battery to be used in the electronic apparatus.

DETAILED DESCRIPTION OF THE PREFERRED EMBODIMENT

Hereinafter, embodiments of the present invention will be described with reference to the drawings. Further, in these drawings, dimensions are partially enlarged, for ease of understanding of the structures. Further, in a second embodiment, portions having the same structures as the structures of a first embodiment will be designated by the same reference numerals and will not be described in detail, and only differences will be described. Further, the present invention is not intended to be restricted by the following embodiments.

First Embodiment

Figure 1:
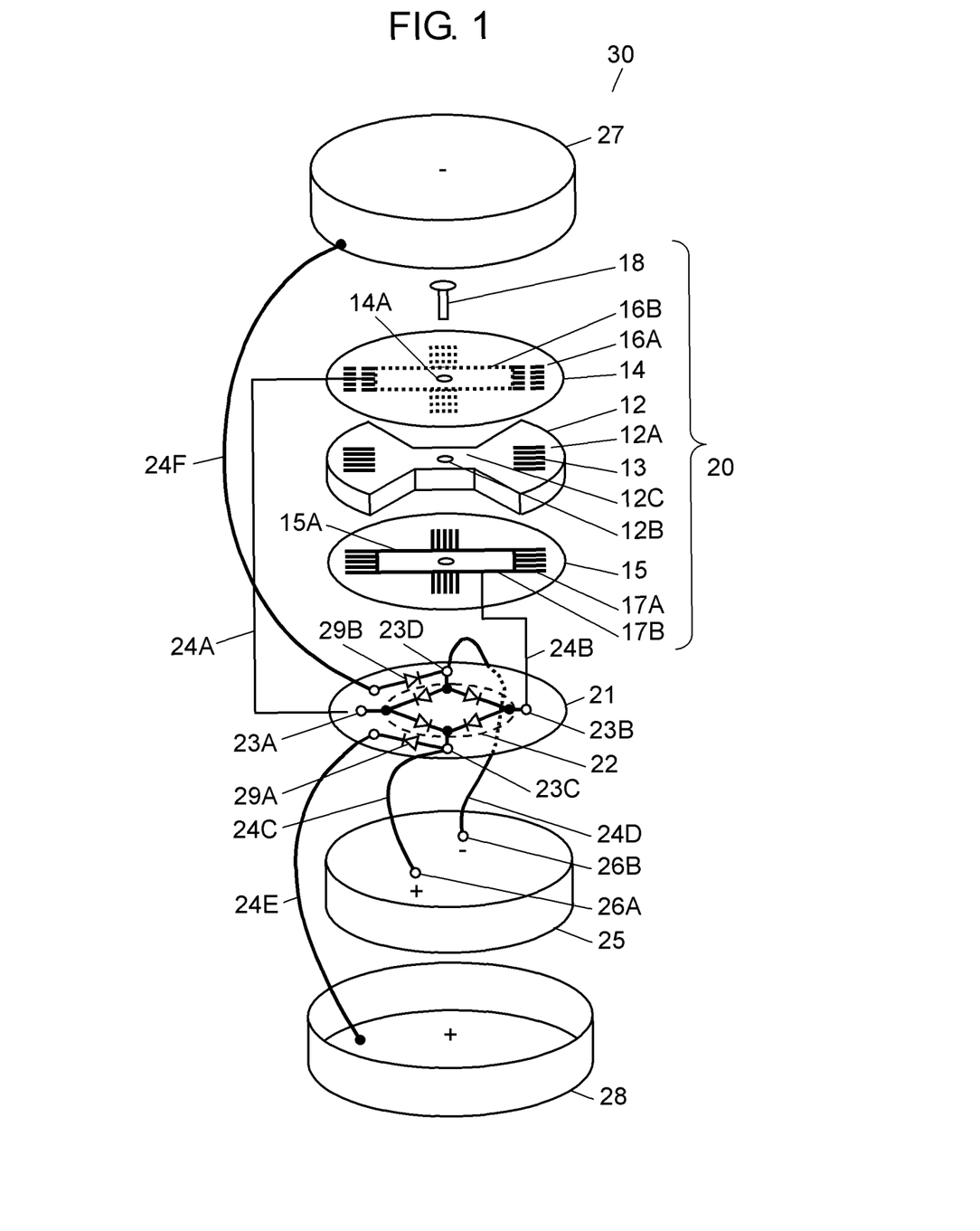
FIG. 1 shows an exploded perspective view of an electric generator according to a first embodiment of the present invention.
Figure 2:
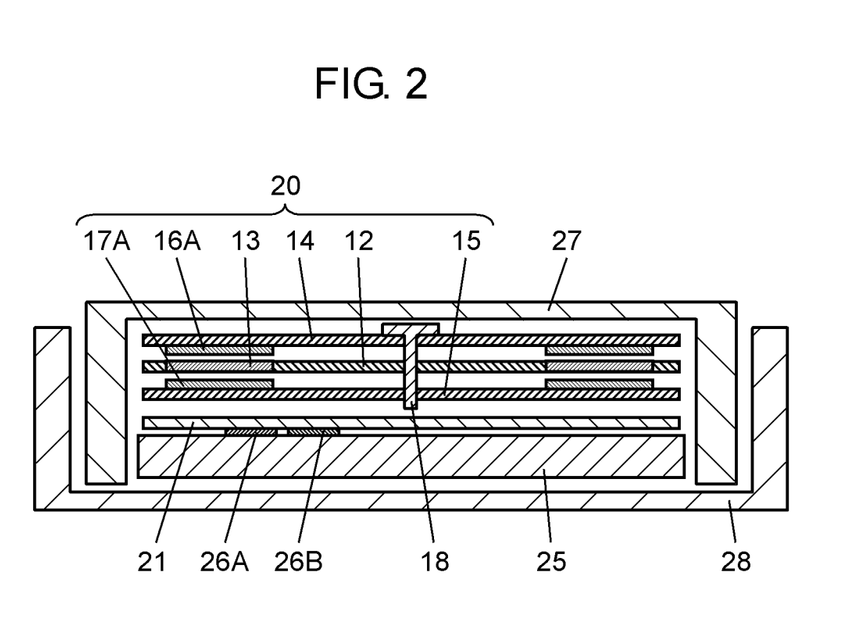
FIG. 2 shows a cross-sectional view of the electric generator illustrated in FIG. 1.

FIG. 1 and FIG. 2 are an exploded perspective view and a cross-sectional view of an electric generator according to a first embodiment of the present invention. Electric generator 30 includes electric-power generating mechanism 20, full-wave rectification circuit 22 as a first rectification portion, electricity accumulation portion 25, outer positive electrode 28, and outer negative electrode 27. Note here that FIG. 1 illustrates wirings 24A to 24F indicating electrical connections by enlarging their lengths.

Electric-power generating mechanism 20 includes fixed electrodes 16A and 16B as first fixed electrodes constituting a first electrode, and fixed electrodes 17A and 17B as second fixed electrodes constituting a second electrode. Full-wave rectification circuit 22 includes terminal 23A electrically connected to fixed electrodes 16A, and terminal 23B electrically connected to fixed electrodes 17B. Terminals 23A and 23B form a pair of input terminals. Full-wave rectification circuit 22 further includes terminal 23C as a positive terminal and terminal 23D as a negative terminal. Terminals 23C and 23D form an output portion. Electricity accumulation portion 25 includes inner positive electrode 26A electrically connected to terminal 23C, and inner negative electrode 26B electrically connected to terminal 23D. Outer positive electrode 28 is electrically connected to inner positive electrode 26A, while outer negative electrode 27 is electrically connected to inner negative electrode 26B. Hereinafter, the respective structures will be described in detail.

Electric-power generating mechanism 20 includes thin plate 14 as a first fixed part, thin plate 15 as a second fixed part, and swingable part 12. Thin plates 14 and 15 formed of circular-shaped insulation bodies are placed so as to sandwich swingable part 12 therebetween. Thin plate 14 is placed above swingable part 12, while thin plate 15 is placed below swingable part 12.

Thin plate 14 is provided with through hole 14A at the center thereof. Thin plate 14 is provided, on the lower surface thereof, with line-shaped fixed electrodes 16A which are arranged in a comb shape, in such a way as to surround through hole 14A in four directions. Further, the respective fixed electrodes 16A are connected to one another through fixed electrodes 16B.

Thin plate 15 is provided with through hole 15A at the center thereof, similarly to thin plate 14. Thin plate 15 is provided, on the upper surface thereof, with line-shaped fixed electrodes 17A which are arranged in a comb shape, in such a way as to surround through hole 15A in four directions. The respective fixed electrodes 17A are connected to one another through fixed electrodes 17B. Fixed electrodes 16A, 16B, 17A and 17B are formed of copper, gold, or copper and a gold-plating applied thereto. Thin plates 14 and 15 can be formed of printed circuit boards or glass boards, and patterns can be formed thereon as fixed electrodes 16A, 16B, 17A and 17B.

Swingable part 12 is made of a metal, a resin or the like. Swingable part 12 includes arc-shaped portions 12A extending in an arc shape at left and right ends thereof, and connection portion 12C connecting arc-shaped portions 12A to each other. Connection portion 12C is provided with through hole 12B at the center thereof. Arc-shaped portions 12A are each provided with movable electrodes 13 which are arranged in a comb shape and penetrated through the upper and lower surfaces thereof. Movable electrodes 13 are formed of an electret. The material of the electret forming movable electrodes 13 can be, for example, tetraethoxysilane, amorphous fluorocarbon resin, polytetrafluoroethylene. Electric charges have been preliminarily held in movable electrodes 13. Movable electrodes 13 formed of an electret as described above are secured to swingable part 12 and are opposed to fixed electrodes 16A and 17A.

Metal fixture pin 18 penetrates through through-hole 14A in thin plate 14, through hole 12B in swingable part 12, and through hole 15A in thin plate 15 and, also, is secured to thin plates 14 and 15, such that thin plates 14 and 15 cannot rotate with respect to fixture pin 18. Swingable part 12 is swingably held between thin plate 14 and thin plate 15, such that it can rotate about the center of through hole 12B. As described above, electric-power generating mechanism 20 of an electrostatic induction type is structured.

The projection of the lower surfaces of fixed electrodes 16A on movable electrodes 13 is placed such that it intersects with movable electrodes 13 while opposing to the upper surfaces of movable electrodes 13, when swingable part 12 swings (turns). Hereinafter, this placement will be simply expressed as "the lower surfaces of fixed electrodes 16A intersect with movable electrodes 13".

Further, the upper surfaces of fixed electrodes 17A are placed such that they intersect with movable electrodes 13 while opposing to the lower surfaces of movable electrodes 13, when swingable part 12 swings. The lower surfaces of fixed electrodes 16A and the upper surfaces of fixed electrodes 17A have such a positional relationship therebetween that they are deviated from each other in the direction of swingable of swingable part 12.

In the present embodiment, in order to provide desired outputs, movable electrodes 13 are made to have a thickness of 1 micrometer or more and 100 micrometers or less, and the spacing between movable electrodes 13 and fixed electrodes 16A and the spacing between movable electrodes 13 and fixed electrodes 17A are made to be equal to 100 micrometers or less. The lower limit thereof is not particularly limited, since it is necessary only that movable electrodes 13, fixed electrodes 16A and fixed electrodes 17A are apart from one another.

Under electric-power generating mechanism 20, there is provided circular-shaped circuit board 21 provided with wirings (not illustrated) on its upper and lower surfaces, and full-wave rectification circuit 22 is provided on the upper surface of circuit board 21. Full-wave rectification circuit 22 as the first rectification portion is constituted by four diodes which are bridge-connected rectification elements.

Four terminals 23A, 23B, 23C and 23D are extended from full-wave rectification circuit 22, as illustrated in FIG. 1. Wiring 24A extended from terminal 23A and wiring 24B extended from terminal 23B are electrically connected to fixed electrodes 16B and fixed electrodes 17B, respectively.

Under circuit board 21, there is placed electricity accumulation portion 25 with a circular cylindrical shape which is constituted by a capacitor or a storage battery. Electricity accumulation portion 25 has inner positive electrode 26A and inner negative electrode 26B. Inner positive electrode 26A is electrically connected to terminal 23C through wiring 24C, and inner negative electrode 26B is electrically connected to terminal 23D through wiring 24D.

Outer negative electrode 27 is formed of a metal to have a substantially circular tubular box shape with an opened lower surface. Outer negative electrode 28 is also formed of a metal to have a substantially circular tubular box shape with an opened upper surface. Electricity accumulation portion 25, circuit board 21 and electric-power generating mechanism 20 are stacked on the bottom surface of outer positive electrode 28 and are enclosed between outer positive electrode 28 and outer negative electrode 27.

In the aforementioned description, fixed electrodes 16A and 17A are opposed to movable electrodes 13 formed of an electret. Alternatively, fixed electrodes 16A and 17A may be formed of electrets, and movable electrodes may be provided on the upper and lower surfaces of swingable part 12 such that these movable electrodes are faced to fixed electrodes 16A and 17A, and full-wave rectification circuit 22 may be connected to these movable electrodes.

Further, it is also possible to form an electric-power generating mechanism by providing only fixed electrodes 16A and 16B, without providing fixed electrodes 17A and 17B. In this case, fixed electrodes 17A and movable electrodes 13 are connected to input terminals of full-wave rectification circuit 22. However, with this structure, movable electrodes 13 can contribute to the electric power generation with only their one side. Therefore, it is preferable that fixed electrodes 17A and 17B are further formed to face movable electrodes 13.

Electric generator 30 is structured to conform to the outer shape of a button-shaped battery or a coin-shaped battery. Electric generator 30 is inserted in a housing space for housing a battery for an electronic apparatus (not illustrated), such as a watch, a hearing aid or a cellular phone, and supplies electricity for driving the electronic apparatus thereto. In other words, electric generator 30 is mounted in an electronic apparatus. Outer positive electrode 28 and outer negative electrode 27 form an outer shape which can be substituted for a battery for use in the electronic apparatus.

Figure 3A:
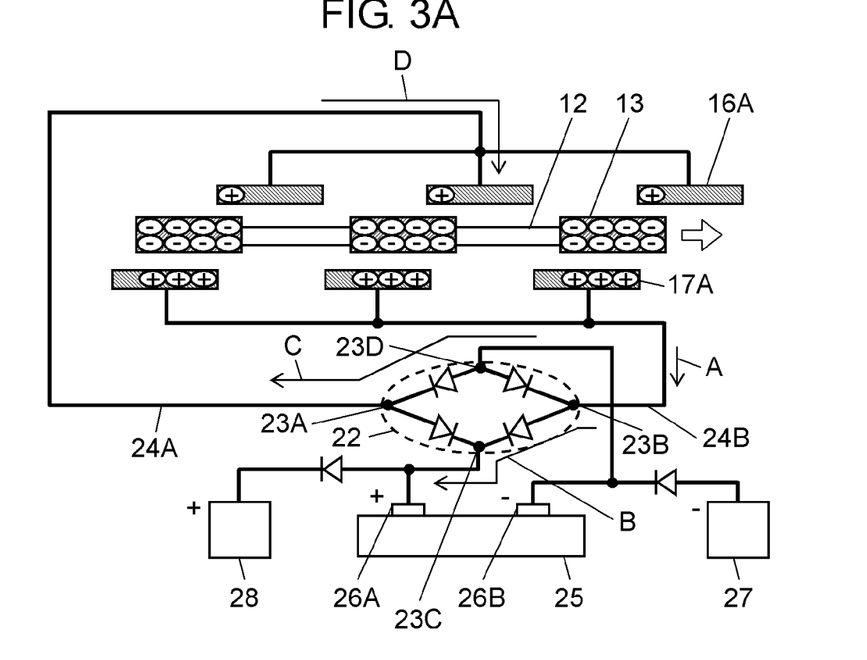
FIG. 3A, FIG. 3B and FIG. 4 show block diagrams illustrating the circuit structure in the electric generator illustrated in FIG. 1.
Figure 3B:
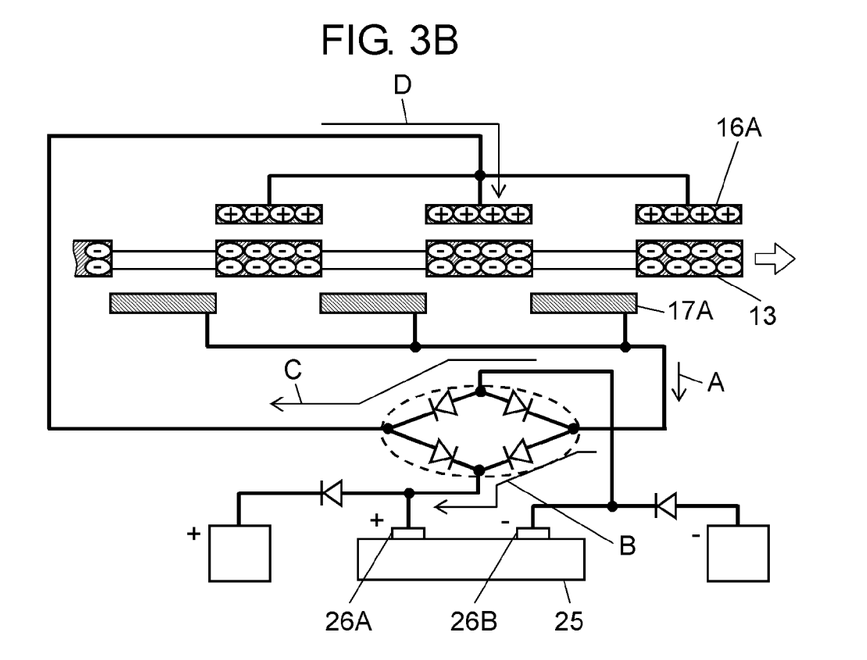
Figure 4:
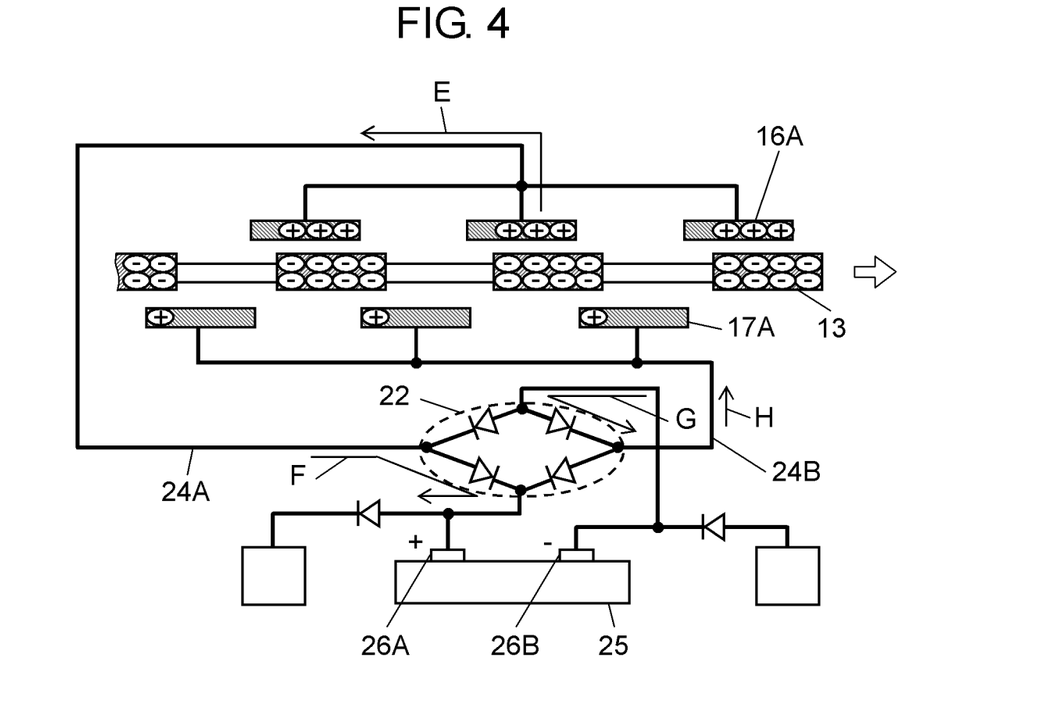

When a user who carries the electronic apparatus is moving or walking, swingable part 12 rotates or swings due to the weight of arc-shaped portions 12A, and intersects with fixed electrodes 16A and 17A, thereby generating electric power. The generated electric power is accumulated in electricity accumulation portion 25, and electricity accumulation portion 25 supplies the accumulated electric power to the electronic apparatus. The principle of the operation will be described with reference to FIGS. 3A to 4. FIGS. 3A to 4 are block diagrams illustrating the circuit structure in electric generator 30.

FIG. 3A illustrates a state where movable electrodes 13 have entered below fixed electrodes 16A provided to be deviated from fixed electrodes 17A, from above fixed electrodes 17A, since swingable part 12 provided with movable electrodes 13 have been swung. At this time, movable electrodes 13 are beginning to intersect with fixed electrodes 16A.

Negative electric charges are held in the upper and lower surfaces of movable electrodes 13. This induces positive electric charges in fixed electrodes 16A opposing thereto, at their portions intersecting therewith. On the other hand, the positive electric charges induced in fixed electrodes 17A gradually decrease.

Along therewith, an electric current is induced in the direction of an arrow A in wiring 24B connected to fixed electrodes 17A, the electric current flows from wiring 24B into full-wave rectification circuit 22, then flows through a path along an arrow B and flows into inner positive electrode 26A in electricity accumulation portion 25. Further, the electric current is flowed from inner negative electrode 26B in electricity accumulation portion 25, then flows through a path along an arrow C in full-wave rectification circuit 22, then flows through a path along an arrow D in wiring 24A and flows into fixed electrodes 16A. As described above, an electric current flows into inner positive electrode 26A and, also, an electric current flows from inner negative electrode 26B, thereby charging electricity accumulation portion 25.

FIG. 3B illustrates a state where movable electrodes 13 have fallen below fixed electrodes 16A, since the swing of movable electrodes 13 has proceeded. At this time, positive electric charges are induced in fixed electrodes 16A, at the portions of their lower portions facing to movable electrodes 13, which are intersecting therewith. On the other hand, the upper surfaces of fixed electrodes 17A have portions intersecting with movable electrodes 13 no longer, thereby decreasing the positive electric charges therein.

As described above, during the transition from the state illustrated in FIG. 3A to the state illustrated in FIG. 3B, positive electric charges are increasingly accumulated in fixed electrodes 16A, while the positive electric charges accumulated in fixed electrodes 17A decrease. Therefore, the directions of electric currents represented by arrows A to D remain unchanged at those described with reference to FIG. 3A, thereby charging electricity accumulation portion 25.

FIG. 4 illustrates a state where movable electrodes 13 have been protruded to the right side from between fixed electrodes 16A and fixed electrodes 17A which oppose to each other, since the swing of movable electrodes 13 have further proceeded. At this time, the positive electric charges induced in fixed electrodes 16A decreases, while positive electric charges are increasingly induced in fixed electrodes 17A.

Along therewith, an electric current is induced in the direction of an arrow E in wiring 24A connected to fixed electrodes 16A, and the electric current is flowed from wiring 24A into full-wave rectification circuit 22, then flows through a path along an arrow F and flows into inner positive electrode 26A in electricity accumulation portion 25. Further, an electric current is flowed from inner negative electrode 26B in electricity accumulation portion 25, then flows through a path along an arrow G in full-wave rectification circuit 22, then flows through a path along an arrow H through wiring 24B and flows into fixed electrodes 17A. As described above, an electric current flows into inner positive electrode 26A and, also, an electric current flows from inner negative electrode 26B, thereby charging electricity accumulation portion 25.

The first rectification portion is preferably constituted by full-wave rectification circuit 22, as described above. Thus, electricity accumulation portion 25 is charged even when the directions of input/output of electric currents with respect to fixed electrodes 16A and fixed electrodes 17A are interchanged. In other words, if movable electrodes 13 vibrate in the horizontal direction, electricity accumulation portion 25 is charged. Specifically, regardless of the directions of electric currents induced between movable electrodes 13 and fixed electrodes 16A and 17A, electricity accumulation portion 25 can be charged. This can increase the efficiency of charging of electricity accumulation portion 25.

Furthermore, since the first rectification portion is constituted by full-wave rectification circuit 22, it is possible to charge electricity accumulation portion 25 without necessitating a ground electric potential, and, moreover, it is possible to eliminate the necessity of discharge of an electric current in the opposite direction to the outside of electric generator 30. This enables electric generator 30 to independently perform a series of operations for electric-power generation, charging and discharging. This eliminates the necessity of a structure for providing a ground electric potential in the circuits in the electronic apparatus which incorporates the electric generator.

Further, as illustrated in FIG. 1, it is preferable that terminal 23C connected to inner positive electrode 26A is electrically connected to outer positive electrode 28 through wiring 24E and diode 29A as a second rectification portion. Alternatively, it is also preferable that terminal 23D connected to inner negative electrode 26B is electrically connected to outer negative electrode 27 through wiring 24F and diode 29B as a third rectification portion. Diode 29A is electrically connected in such a direction as to prevent an electric current from flowing to inner positive electrode 26A in electricity accumulation portion 25 from outer positive electrode 28, while diode 29B is electrically connected in such a direction as to prevent an electric current from flowing to outer negative electrode 27 from inner negative electrode 26B in electricity accumulation portion 25. Meanwhile, it is possible to prevent an electric current from flowing from outer positive electrode 28 to outer negative electrode 27, by connecting at least one of diode 29A and diode 29B thereto. Therefore, it is enough to provide at least one of them.

This structure can prevent an electric current from flowing from outer positive electrode 28 to outer negative electrode 27 within electric generator 30. This prevents an electric current from flowing from the circuits in the electronic apparatus to electricity accumulation portion 25. This results in reduction of the load exerted on the circuits in the electronic apparatus.

Thin plates 14 and 15 are required only to be capable of fixing fixed electrodes 16A and 17A with respect to movable electrodes 13, and their shapes are not limited. For example, instead of thin plate 14, the first fixed part may be made of an insulation material placed on the inner bottom surface of outer negative electrode 27, and fixed electrodes 16A may be secured to this insulation material. Further, fixed electrodes 16B which connect fixed electrodes 16A to one another may also be formed of wirings with electrical insulating coating.

Further, in order to enable substitution for an existing battery, outer negative electrode 27 and outer positive electrode 28 preferably form an outer shape which conforms to IEC60086, which is a battery standard defined by International Electrotechnical Commission or to JISC8500, which is a JIS standard corresponding thereto in Japan. For example, the outer shape may conform to specific symbols, such as R41, R43, R44, R48, R54, R55, R70, which are outer dimension standards. Even when no specific symbol is specified, it is preferable that the outer shape conforms to, for example, R1632, R2450, R1025, R1216, R1220, R1225, R1616, R2012, R2016, R2025, R2032, R2325, R2330, R2354, R2477, R3032, which are existing battery dimensions. Further, the first two digits of the number indicate the diameter, and the last two digits indicate the thickness. For example, "2032" indicates a diameter of 20 mm and a thickness of 3.2 mm.

Further, although FIG. 1 illustrates outer negative electrode 27 and outer positive electrode 28 forming an outer shape which can be substituted for an existing battery, outer negative electrode 27 and outer positive electrode 28 may be formed separately from an outer case.

Figure 5A:
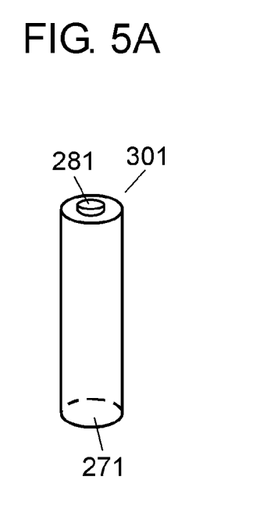
FIGS. 5A to 5C show perspective views illustrating the outer shapes of other electric generators according to the first embodiment of the present invention.
Figure 5B:
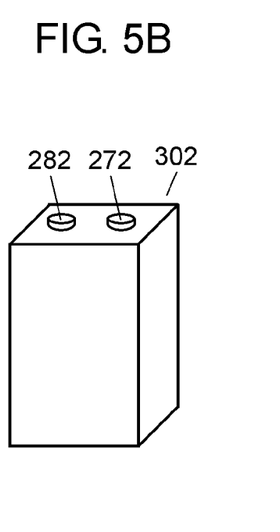
Figure 5C:
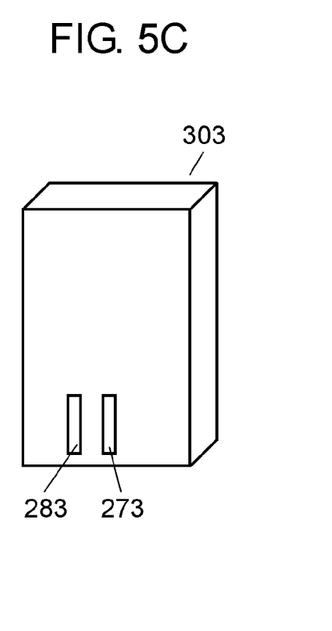

Alternatively, as illustrated in FIG. 5A to FIG. 5C, it is possible to provide a structure which can be substituted for a circular-cylindrical-shaped or rectangular-shaped battery. FIG. 5A to FIG. 5C are perspective views of other electric generators according to the present embodiment. More specifically, for example, it is possible to provide a structure having outer positive electrode 281 at its upper end and outer negative electrode 271 at its lower end, as circular-cylindrical-shaped electric generator 301 illustrated in FIG. 5A. Electric generator 301 is formed to have an outer shape with an outer dimension, such as R03, R6, R14, R20, R123A, R2, which are defined as standards of IEC60086 or JISC8500. "R03" corresponds to an AAA size, "RI" corresponds to an N size, "R6" corresponds to an AA size, "R14" corresponds to a C size, and "R20" corresponds to a D size.

Further, for example, as electric generator 302 with a rectangular shape illustrated in FIG. 5B, it is possible to form a structure having outer positive electrode 282 and outer negative electrode 272 arranged on its upper end and, further, having an outer shape conforming to 6F22 (for use in 9V-batteries), which is an outer dimension standard. By forming the electric generator in conformance to the outer shape of a common battery, it is possible to cause the electric generator to have general versatility, thereby enabling using it in a wide variety of electronic apparatuses.

Furthermore, as electric generator 303 illustrated in FIG. 5C, it is possible to provide a structure having outer positive electrode 283 and outer negative electrode 273 arranged on its front surface. Specifically, it is also possible to form the outer shape of electric generator 303, in conformance to the outer shape of a battery pack having an electric capacity larger than those of common dry batteries used in electronic apparatuses such as cellular phones. In other words, by forming its outer shape to have a rectangular parallelepiped shape and by providing outer positive electrode 283 and outer negative electrode 273 on the same surface, it is possible to use electric generator 303 by substituting it for a battery having an outer shape which is not defined by standards of IEC60086 or JISC8500.

Portable electronic apparatuses employ batteries which conform to various standards. To cope with them, electric generators can be formed to have outer shapes in conformance to the outer shapes of commonly-used batteries of various types. This enables fabrication of electric generators which can be substituted for these respective batteries, thereby improving their usability.

Figure 6:
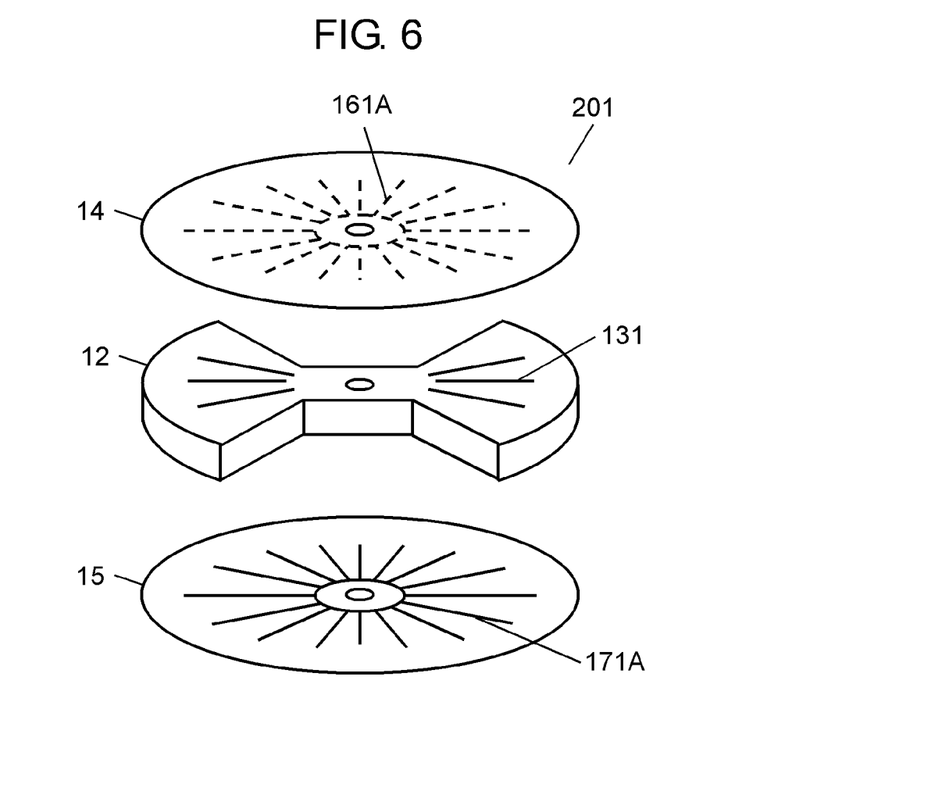
FIG. 6 shows a perspective view of an electric-power generating mechanism in another electric generator according to the first embodiment of the present invention, at a state where the electric-power generating mechanism is disassembled.

Next, with reference to FIG. 6 and FIG. 7, there will be described different structures of swingable part 12 and thin plates 14 and 15 as fixed bodies. FIG. 6 is a perspective view of an electric-power generating mechanism in another electric generator according to the present embodiment, at a state where the electric-power generating mechanism is disassembled. In the structure of FIG. 1, each of movable electrodes 13, fixed electrodes 16A and fixed electrodes 17A are placed in parallel. On the other hand, in electric-power generating mechanism 201 illustrated in FIG. 6, each of movable electrodes 131 and fixed electrodes 161A and 171A are placed radially from the center. Fixed electrodes 161A are connected to one another at their end portions near the center.

Fixed electrodes are connected in a same manner. A first electrode and a second electrode are constituted by these end portions connected to one another near the center. The above-described structure in which fixed electrodes 161A and 171A are placed throughout the entire circumstances of thin plates 14 and 15, respectively enables charging electricity accumulation portion 25, regardless of the positions to which movable electrodes 131 swing (vibrate or turn).

Further, similarly to the structure of FIG. 1, it is possible to provide only fixed electrodes 161A without providing fixed electrodes 171A to form the electric-power generating mechanism, but it is preferable to provide both of them.

Figure 7:
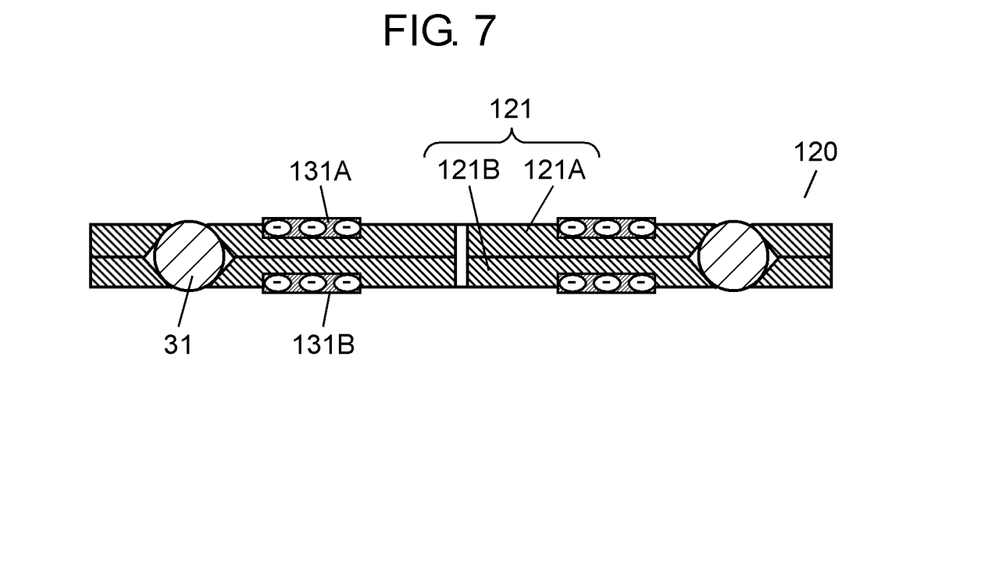
FIG. 7 shows a cross-sectional view of a swingable part in still another electric generator according to the first embodiment of the present invention.

FIG. 7 is a cross-sectional view of a swingable part in still another electric generator according to the present embodiment. Swingable part 120 illustrated in FIG. 7 includes first swingable plate 121A, second swingable plate 121B attached to first swingable plate 121A through an adhesive agent or the like (not illustrated), and spherical bodies 31 made of metal such as steel. First swingable plate 121A and second swingable plate 121B constitute swingable plate 121.

Spherical bodies 31 are rotatably sandwiched at a predetermined position between first swingable plate 121A and second swingable plate 121B. Spherical bodies 31 are partially protruded from swingable plates 121A and 121B. As described above, a bearing may be constituted by spherical bodies 31.

Movable electrodes 131A formed of an electret are provided on the upper surface of swingable plate 121A, while movable electrodes 131B formed of an electret are provided on the lower surface of swingable plate 121B. For example, negative electric charges are held in the upper surfaces of movable electrodes 131A and in the lower surfaces of movable electrodes 131B.

With this structure, it is possible to reduce the friction in swinging swingable part 120, thereby allowing swingable part 120 to vibrate efficiently. This can increase the efficiency of charging electricity accumulation portion 25.

Alternatively, swingable plate 121 may be integrally formed of a resin mold, as well as from swingable plates 121A and 121B attached to each other. This can be attained by, for example, performing molding for swingable plate 121 with spherical bodies 31 coated with a resist and, thereafter, removing the resist therefrom. By doing this, spherical bodies 31 can be rotatably embedded in swingable plate 121 and may be partially protruded from swingable plate 121. Further, the structure of FIG. 7 may be combined with the structure of FIG. 6.

Meanwhile, in a case where fixed electrodes 16A and 16B are formed and fixed electrodes 17A and 17B are not provided, that is, the fixed electrodes are provided only on one side of swingable plate 121, spherical bodies 31 may be protruded only from swingable plate 121 from a surface facing thin plate 14. In other words, it is enough that spherical bodies 31 are protruded from at least one of swingable plates 121A and 121B.

Figure 8:
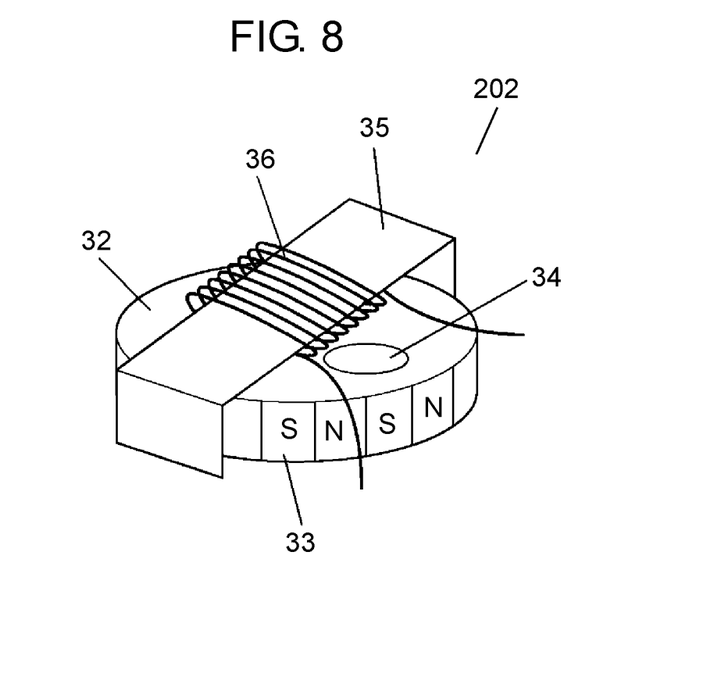
FIG. 8 shows a perspective view of yet another electric-power generating mechanism according to the first embodiment of the present invention.

Moreover, although electric-power generating mechanism 20 is of an electrostatic induction type using an electret, the electronic-power generating mechanism may be of an electromagnetic induction type. Such an electric-power generating mechanism will be described with reference to FIG. 8. FIG. 8 is a perspective view of yet another electric-power generating mechanism according to the present embodiment. Electric-power generating mechanism 202 includes movable part 32 having magnets 33, induction part 35, and coil 36 wound on induction part 35. The opposite ends of coil 36 form a first electrode and a second electrode to be connected to terminals 23A and 23B of full-wave rectification circuit 22 as the first rectification portion illustrated in FIG. 1.

Movable part 32 having a substantially-circular-cylindrical shape is made of a resin. Magnets 33 are attached to the side surface of movable part 32. S poles and N poles are alternately arranged on the side surface of movable part 32. Further, movable part 32 is provided with circular-cylindrical-shaped weight 34 made of metal, for example, so that movable part 32 is eccentric. Thus, for example, if electric-power generating mechanism 202 is translated, movable part 32 swings or rotates along therewith, in directions along the side surface of movable part 32.

Induction part 35 is formed of a material with magnetic permeability (a magnetic material), such as steel or ferrite, and, also, is bent to have an inverse-U shape. Coil 36 is wound on induction part 35 substantially at its center. Induction part 35 is assembled with movable part 32 from thereabove, such that the end portions of induction part 35 face the side surface of movable part 32. In other words, induction part 35 has end surfaces which face movable part 32. Electric-power generating mechanism 202 is structured as described above. Further, magnets 33 attached to the side surface of movable part 32 have opposite magnetic poles in the respective front and back surfaces with the center of movable part 32 sandwiched therebetween, in order to ensure that the opposite ends of induction part 35 face different magnetic poles (an S pole and an N pole).

Next, operations of electric-power generating mechanism 202 will be described in brief. If movable part 32 swings, turns or rotates, magnet 33 facing induction part 35 moves. This changes the directions of magnetic forces acting on induction part 35, thereby changing the direction of magnetic currents in induction part 35. For example, if magnet 33 moves to the adjacent magnet positions, the magnetic poles facing to induction part 35 are interchanged.

Along with the change, coil 36 induces an electric current therein, in such a way as to induce magnetic currents against the change of magnetic currents in induction part 35. Particularly, if movable part 32 swings or rotates to move magnet 33 facing induction part 35 to the adjacent magnet positions, the directions of magnetic currents flowing through induction part 35 are changed to the opposite directions, thereby changing the direction of the electric current flowing through coil 36 to the opposite direction. In other words, due to the swing or rotation of movable part 32, the direction of the electric current flowing through coil 36 is changed, thereby inducing an alternating current. This alternating current is rectified by full-wave rectification circuit 22 and accumulated in electricity accumulation portion 25, similarly to the aforementioned electric-power generating mechanism 20 of an electrostatic induction type.

As described above, the electric generator according to the present embodiment includes electric-power generating mechanism 20 of an electrostatic induction type or electric-power generating mechanism 202 of an electromagnetic induction type, the first rectification portion, electricity accumulation portion 25, outer positive electrode 28, and outer negative electrode 27. Full-wave rectification circuit 22 as the first rectification portion includes a pair of input terminals (terminals 23A and 23B) which are electrically connected to a first electrode and a second electrode, respectively, of the electric-power generating mechanism, and an output portion constituted by a positive terminal (terminal 23C) and a negative terminal (terminal 23D). Electricity accumulation portion 25 includes inner positive electrode 26A electrically connected to terminal 23C and inner negative electrode 26B electrically connected to terminal 23D. The electric generator has an outer shape which can be substituted for a battery for use in an electronic apparatus. This enables using the electric generator according to the present embodiment by substituting it for a battery incorporated in the electronic apparatus. Accordingly, electric power generated by the electric generator can be utilized by even other apparatuses than the electronic apparatus structured on the presumption that it incorporates the electric generator.

Second Embodiment

Figure 9:
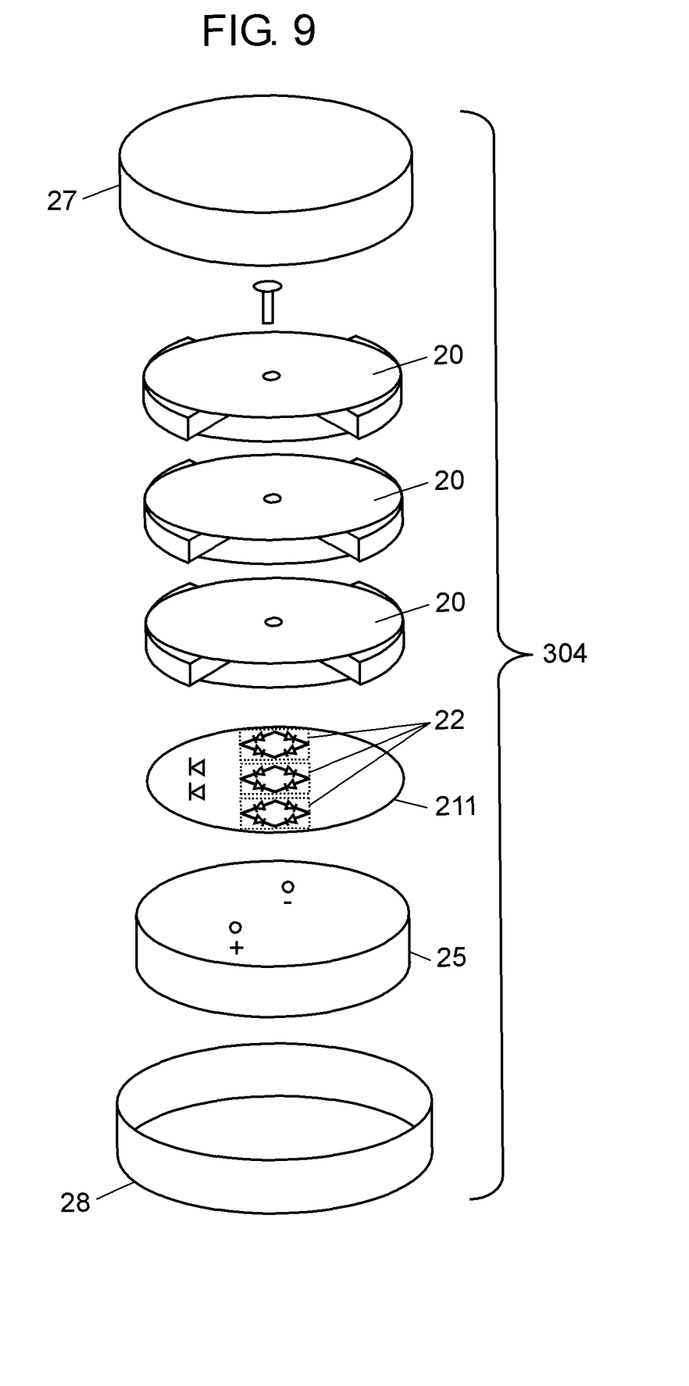
FIG. 9 shows an exploded perspective view of an electric generator according to a second embodiment of the present invention.
Figure 10:
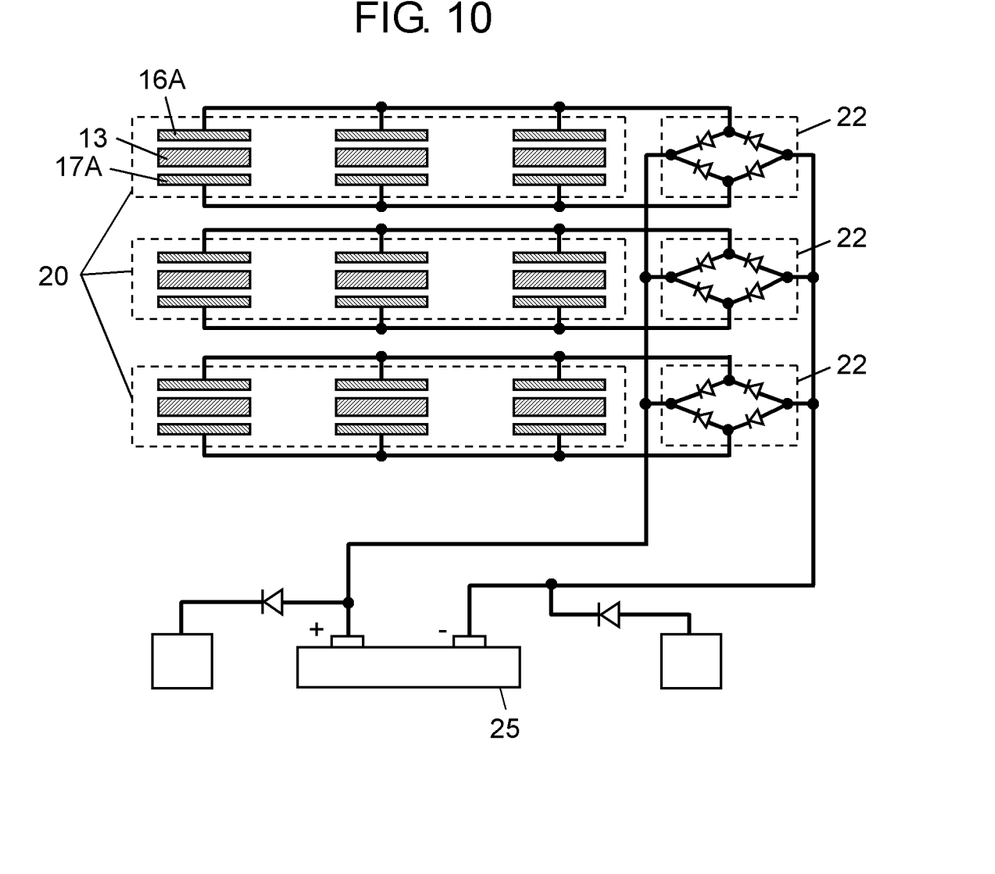
FIG. 10 shows a block diagram illustrating the circuit structure in the electric generator illustrated in FIG. 9.

FIG. 9 is an exploded perspective view of an electric generator according to a second embodiment of the present invention. FIG. 10 is a block diagram illustrating the circuit structure in the electric generator. Further, in FIG. 9, wirings are not illustrated. Electric generator 304 according to the present embodiment includes plural electric-power generating mechanisms 20 stacked in the vertical direction, between outer negative electrode 27 and electricity accumulation portion 25. Further, on circuit board 211, there are provided full-wave rectification circuits 22 which are connected to the respective electric-power generating mechanisms 20 in parallel. Other basic structures are the same as those of the first embodiment.

As described above, providing electric-power generating mechanisms 20 increases the total amount of electric power generated by electric generator 304. Further, even if an abnormality occurs in one of electric-power generating mechanisms 20, electricity accumulation portion 25 can be charged by the remaining electric-power generating mechanisms 20.

Further, since full-wave rectification circuits 22 are electrically connected to the respective electric-power generating mechanisms 20, the electric current generated from one of electric-power generating mechanisms 20 is prevented from flowing into the other electric-power generating mechanisms 20. This enables charging electricity accumulation portion 25 with excellent efficiency.

While there is illustrated a case where the number of electric-power generating mechanisms 20 and the number of full-wave rectification circuits 22 are each three in FIG. 9 and FIG. 10, the present invention is not limited thereto, and it is necessarily only that the numbers of electric-power generating mechanisms 20 and full-wave rectification circuits 22 are equal to or more than two.

In the present embodiment, similarly, the electric generator can be made to have a circular-cylindrical-shaped, rectangular-shaped outer shape, or an outer shape conforming to the outer shape of a battery pack having a substantially-rectangular-parallelepiped shape, as described with reference to FIGS. 5A to 5C in the first embodiment.

Further, the present embodiment is the same as the first embodiment, in that the movable electrodes and the fixed electrodes can be formed radially from the center as described with reference to FIG. 6, in that the swingable part can be constituted by swingable plates attached to each other and spherical bodies sandwiched between these swingable plates as described with reference to FIG. 7, and in that an electromagnetic-induction type electric generator can be employed as described with reference to FIG. 8.

As described above, with the electric generator according to the present invention, electric power generated by the electric generator can be used by even other apparatuses than an electronic apparatus structured on the presumption that it incorporates the electric generator. The present invention is usable as an electric generator mainly for use in various types of electronic apparatuses and, particularly, for use in portable electronic apparatuses.

What is claimed is:

1. An electric generator to be mounted in an electronic apparatus, comprising:
an electric-power generating mechanism having a first electrode and a second electrode and being one of an electrostatic induction type and an electromagnetic induction type;
a first rectification portion having a pair of input terminals electrically connected to the first electrode and the second electrode of the electric-power generating mechanism respectively, and having an output portion including a positive terminal and a negative terminal;
an electricity accumulation portion having an inner positive electrode electrically connected to the positive terminal and an inner negative electrode electrically connected to the negative terminal; and
an outer positive electrode electrically connected to the inner positive electrode and an outer negative electrode electrically connected to the inner negative electrode; wherein
the electric generator has an outer shape which can be substituted for a battery to be used in the electronic apparatus.

2. The electric generator according to claim 1, wherein
the electric-power generating mechanism is of an electrostatic induction type, and the electric-power generating mechanism includes:
a first fixed part,
a first fixed electrode secured to the first fixed part,
a swingable part, and
a movable electrode formed of an electret, secured to the swingable part and facing the first fixed electrode.

3. The electric generator according to claim 2, wherein
the electric-power generating mechanism further includes a second fixed part and a second fixed electrode secured to the second fixed part and facing the movable electrode,
the first fixed part and the second fixed part are placed with the swingable part sandwiched therebetween, and
the first fixed electrode forms the first electrode, and the second fixed electrode forms the second electrode.

4. The electric generator according to claim 1, wherein
the electric-power generating mechanism is of an electromagnetic induction type,
the electric-power generating mechanism includes:
a movable part having a magnet;
an induction part having an end surface which faces to the movable part; and
a coil wound on the induction part, and having two ends which forms the first electrode and the second electrode.

5. The electric generator according to claim 1, wherein the outer shape of the electric generator conforms to an outer shape defined by a standard of IEC60086 or JISC8500.

6. The electric generator according to claim 1, wherein the outer shape of the electric generator is rectangular-parallelepiped and the outer positive electrode and the outer negative electrode are on a same outer surface of the electric generator.

7. The electric generator according to claim 1, wherein
the swingable part includes:
a swingable plate, and
a spherical body rotatably embedded in the swingable plate and partially protruded from the swingable plate.

8. The electric generator according to claim 7, wherein
the swingable plate includes a first swingable plate, and a second swingable plate attached to the first swingable plate, the spherical body is rotatably sandwiched at a predetermined position between the first and second swingable plates, and the spherical body is partially protruded from at least one of the first and second swingable plates.

9. The electric generator according to claim 1, further comprising at least one of a second rectification portion and a third rectification portion, wherein the second rectification portion is connected between the electricity accumulation portion and the outer positive electrode and is adapted to prevent an electric current from flowing from the outer positive electrode to the electricity accumulation portion, and the third rectification portion is connected between the electricity accumulation portion and the outer negative electrode and is adapted to prevent an electric current from flowing to the outer negative electrode from the electricity accumulation portion.

10. The electric generator according to claim 1, wherein the first rectification portion includes a full-wave rectification circuit including plural rectification elements.

11. The electric generator according to claim 1, wherein the first fixed electrode is one of plural first fixed electrodes, and each of the plural first fixed electrodes are formed radially from a center of the first fixed part, and the movable electrode is one of plural movable electrodes, and each of the plural movable electrodes are formed radially from a center of the swingable part.

12. The electric generator according to claim 11, wherein the electric-power generating mechanism further includes a second fixed part, and plural second fixed electrodes secured to the second fixed part, each formed radially from a center of the second fixed part and facing the movable electrodes, the first fixed part and the second fixed part are placed with the swingable part sandwiched therebetween, and the first fixed electrodes form the first electrode, and the second fixed electrodes form the second electrode.

13. The electric generator according to claim 1, wherein the electric-power generating mechanism is one of plural electric-power generating mechanisms, and the first rectification portion is provided for each of the plural electric-power generating mechanisms.

14. The electric generator according to claim 13, wherein each of the first rectification portions includes a full-wave rectification circuit including plural rectification elements.

\* \* \* \* \*